US012804353B2

(12) United States Patent
Raison

(10) Patent No.: US 12,804,353 B2
(45) Date of Patent: Nov. 17, 2026

(54) KEY TRACKING SYSTEM

(71) Applicant: Terry Raison, Addison (CA)

(72) Inventor: Terry Raison, Addison (CA)

( * ) Notice: Subject to any disclaimer, the term of this patent is extended or adjusted under 35 U.S.C. 154(b) by 303 days.

(21) Appl. No.: 18/402,828

(22) Filed: Jan. 3, 2024

(65) Prior Publication Data

US 2025/0220389 A1 Jul. 3, 2025

(51) Int. Cl.
*H04W 4/029* (2018.01)
*H04W 4/02* (2018.01)

(52) U.S. Cl.
CPC ........... *H04W 4/029* (2018.02); *H04W 4/023* (2013.01)

(58) Field of Classification Search
CPC ........ H04W 4/029; H04W 4/02; H04W 4/023
See application file for complete search history.

(56) References Cited

U.S. PATENT DOCUMENTS

D392,201 S 3/1998 Chen
8,519,906 B2 8/2013 Richards
8,847,754 B2 9/2014 Buchheim
8,855,672 B1 10/2014 Cohn
10,271,171 B2 4/2019 Evans
10,546,228 B2 1/2020 Daoura
2009/0293567 A1* 12/2009 Yuen ........................ E05B 19/22 73/488
2014/0135042 A1* 5/2014 Buchheim ............... G01S 1/725 455/566
2017/0360169 A1 12/2017 Stein
2019/0147311 A1* 5/2019 Purba ............... G06K 19/07713 340/572.1
2021/0258732 A1* 8/2021 Robinson .............. H04W 4/023
2022/0235577 A1* 7/2022 Sferopoulos .......... B23P 15/005

* cited by examiner

*Primary Examiner* — Margaret G Webb

(57) ABSTRACT

A key tracking system for locating a key on a map includes a personal electronic device having an application providing a user interface. The key tracking system further comprises a key having a bow. The bow has a front wall, a rear wall, and a peripheral wall extending between the rear wall and the front wall to define an interior space between the front wall and the rear wall. A location tracker is positioned within the interior space and is electronically coupled to the application. The location tracker identifies a location of the key and relays data corresponding to the location to the application thereby indicating the location of the key on the application. For example, the location tracker may comprise a global positioning system unit or a radio frequency identification tag. A battery is positioned within the interior space and is electronically coupled with the location tracker.

9 Claims, 8 Drawing Sheets

KEY TRACKING SYSTEM

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to tracking devices and more particularly pertains to a new tracking device for locating a key on a map.

(2) Description of Related Art Including Information Disclosed Under 37 CFR 1.97 and 1.98

The prior art relates to tracking devices. Some prior art devices are trackable devices that can attach to an article, such as a key ring, to allow a user to locate the article using a smartphone. Such trackable devices commonly use global positioning system unit chips or radio frequency identification tags to provide location data of the article to the smartphone. Other prior art disclosures teach key fob devices having integrated transceivers that allow the user to locate the key fob using the smartphone. However, such integrated transceivers are typically only available for electronic key fobs and have not been integrated into keys with blades that are designed for insertion into a lock. Thus, there is a need for a key tracking system that can be used with electronic fobs as well as standard keys with blades, such as household, business, and construction vehicle keys. There is also a need in the art for a key tracking system that can provide location information quickly and easily for a plurality of keys.

(h) BRIEF SUMMARY OF THE INVENTION

An embodiment of the disclosure meets the needs presented above by generally comprising a personal electronic device having an application providing a user interface. The embodiment further comprises a key having a bow. The bow has a front wall, a rear wall, and a peripheral wall extending between the rear wall and the front wall to define an interior space between the front wall and the rear wall. A location tracker is positioned within the interior space and is electronically coupled to the application. For example, the location tracker may comprise a global positioning system unit or a radio frequency identification tag. The location tracker identifies a location of the key and relays data corresponding to the location to the application thereby indicating the location of the key on the application. The user interface may include a map indicating the location. A battery is positioned within the interior space and is electronically coupled with the location tracker.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
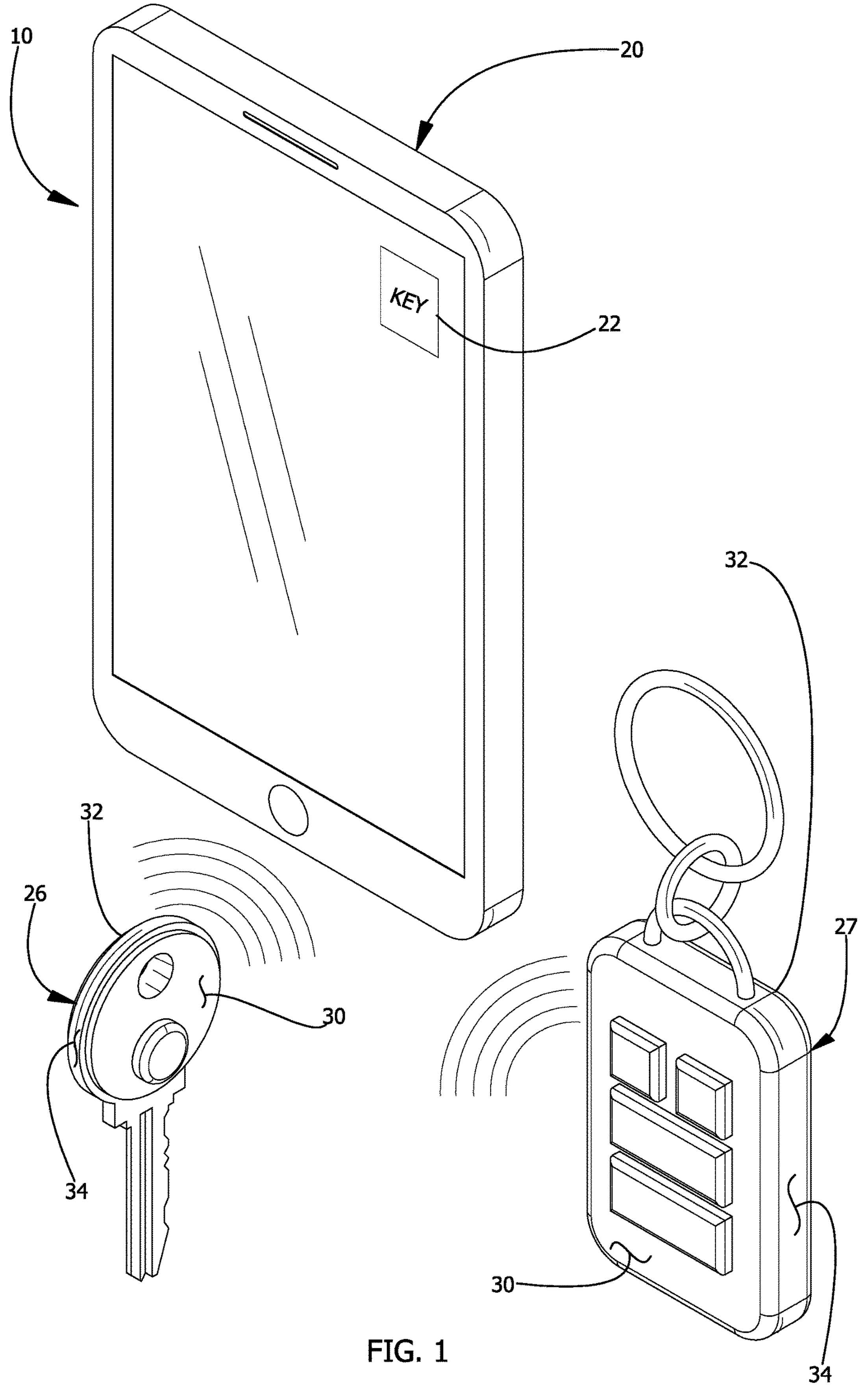
FIG. 1 is an isometric view of a key tracking system according to an embodiment of the disclosure.
Figure 2:
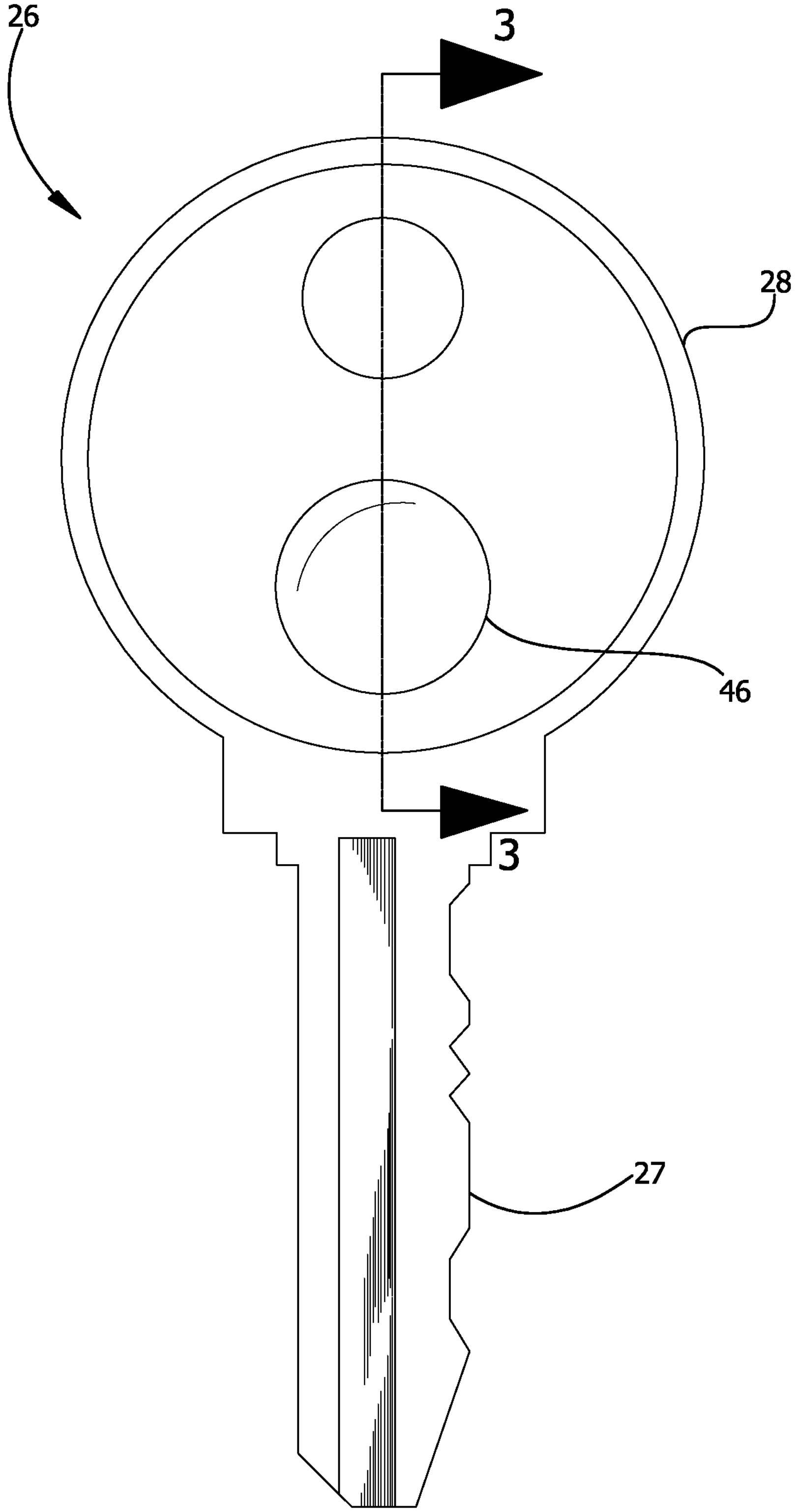
FIG. 2 is a front view of an embodiment of the disclosure.
Figure 3:
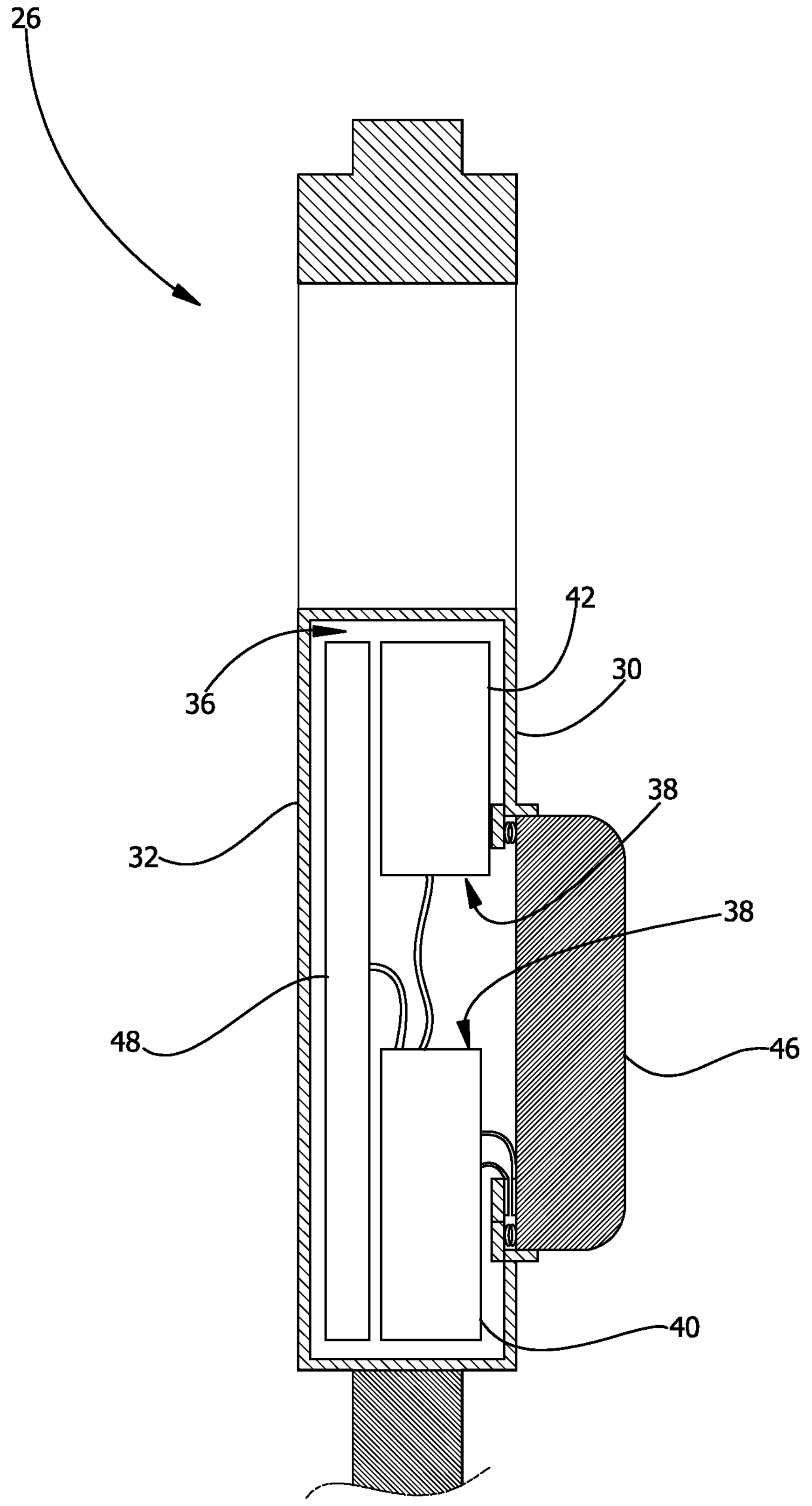
FIG. 3 is a cross-sectional view of an embodiment of the disclosure.

With reference now to the drawings, and in particular to FIGS. 1 through 8 thereof, a new tracking device embodying the principles and concepts of an embodiment of the disclosure and generally designated by the reference numeral 10 will be described.

As best illustrated in FIGS. 1 through 8, the key tracking system 10 generally comprises a personal electronic device 20 having an application 22 with a user interface 24. The application 22 may include an internet browser or a mobile application. The user interface 24 may include a website or a user interface of the mobile application. The personal electronic device 20 may be any kind of computing device, such as a mobile phone, a smart watch, a tablet, or a computer.

The application 22 may be paired with a key 26. In some embodiments, the key 26 comprises an electronic key fob 27. In other embodiments, the key 26 comprises a standard key 26, for example having a bow 28 and a blade 29 extending downwardly from the bow 28. The blade 29 is generally configured for insertion in a lock and may be cut in a shape corresponding to the lock. Embodiments of the key 26 generally include a bow 28. The bow 28 generally has a front wall 30, a rear wall 32, and a peripheral wall 34 extending between the rear wall 32 and the front wall 30 to define an interior space 36 between the front wall 30 and the rear wall 32.

A location tracker 38, or location identifying means 38, is generally positioned within the interior space 36 and electronically coupled to the application 22. The location tracker 38 identifies a location of the key 26 and relays data corresponding to the location to the application 22 thereby indicating the location of the key 26 on the application 22.

Figure 6:
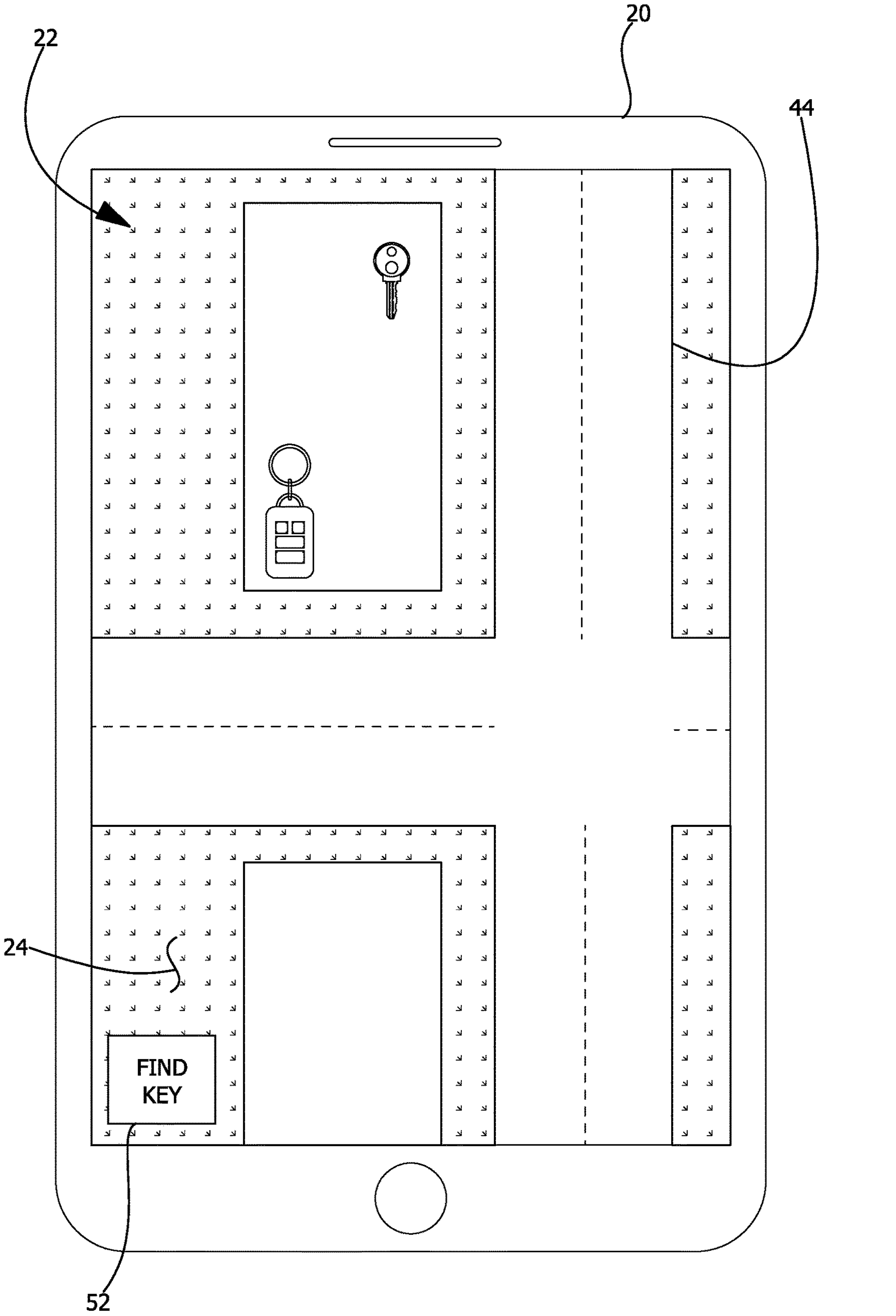
FIG. 6 is an in-use view of an embodiment of the disclosure.
Figure 7:
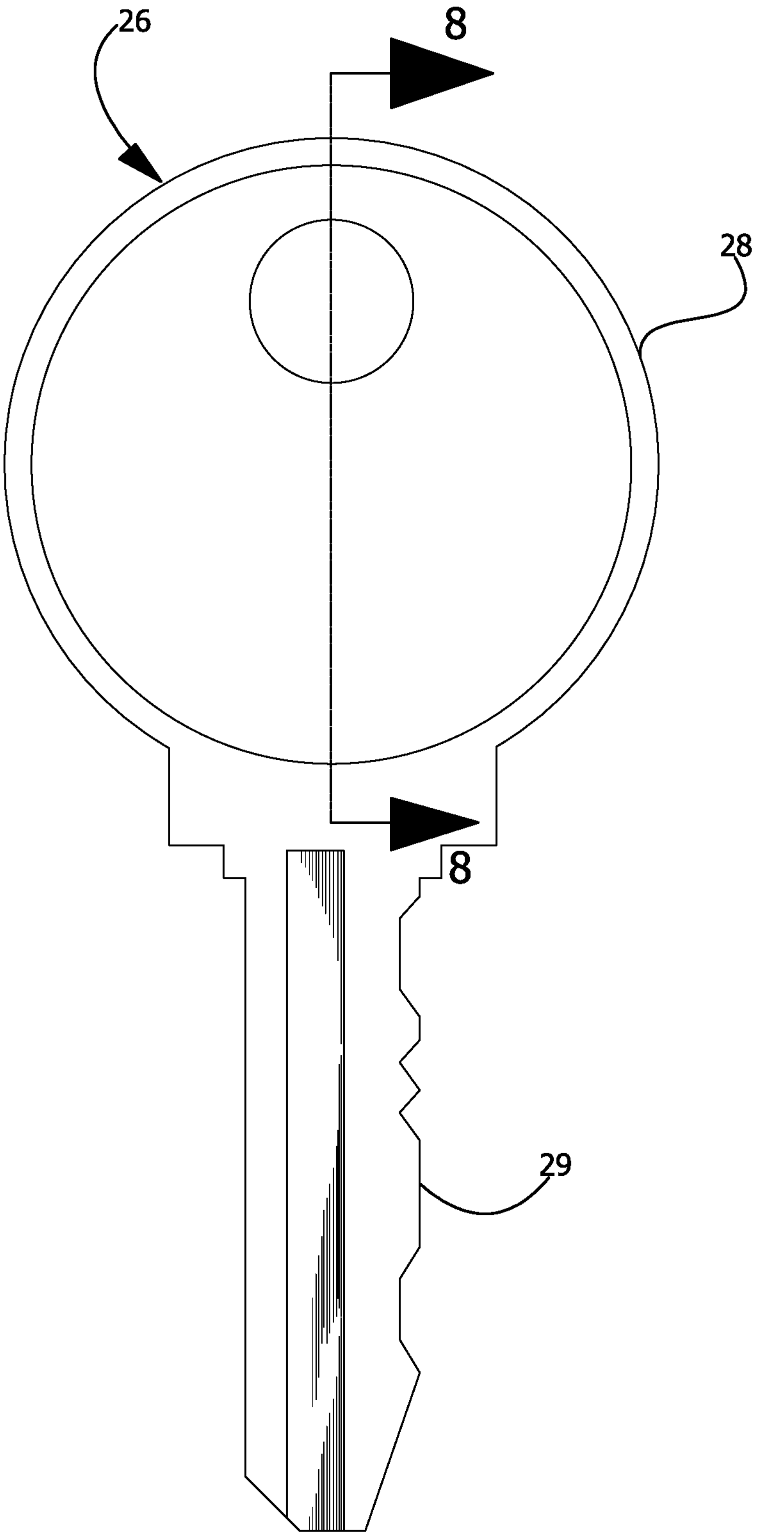
FIG. 7 is a front view of an alternative embodiment of the disclosure.
Figure 8:
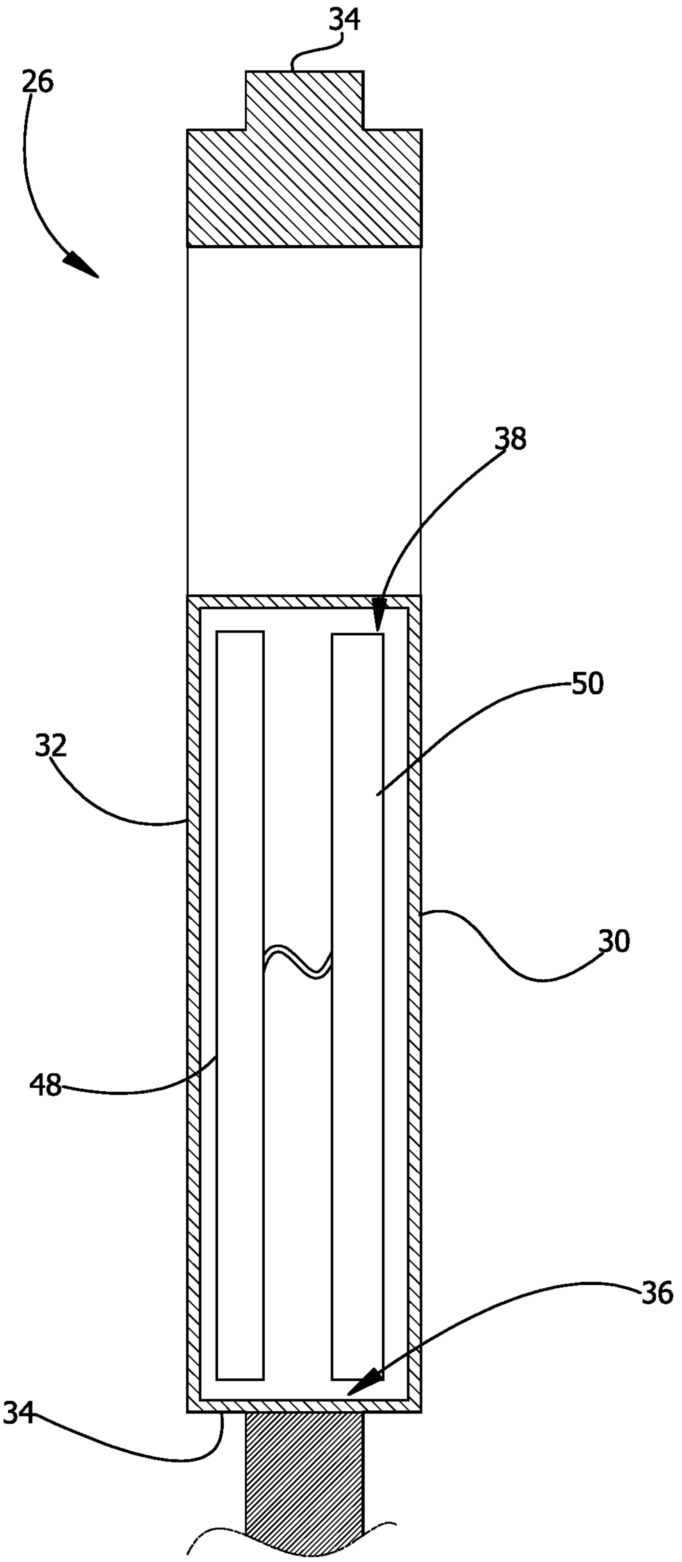
FIG. 8 is a cross-sectional view of the alternative embodiment depicted in FIG. 7.

In some embodiments, the location identifying means 38 comprises a central processing unit 40 that is positioned within the interior space 36. The central processing unit 40 is in wireless electronic communication with the application 22. A global positioning system unit 42 is also positioned within the interior space 36. The global positioning system unit 42 is electronically coupled with the central processing unit 40. The global positioning system unit 42 provides a location of the key 26 to the central processing unit 40, whereby the central processing unit 40 is configured to provide data identifying the location to the application 22. As shown in FIG. 6, the user interface 24 may include a map 44 indicating the location of the key 26 when the global positioning system unit 42 is in wireless electronic communication with the application 22.

Figure 4:
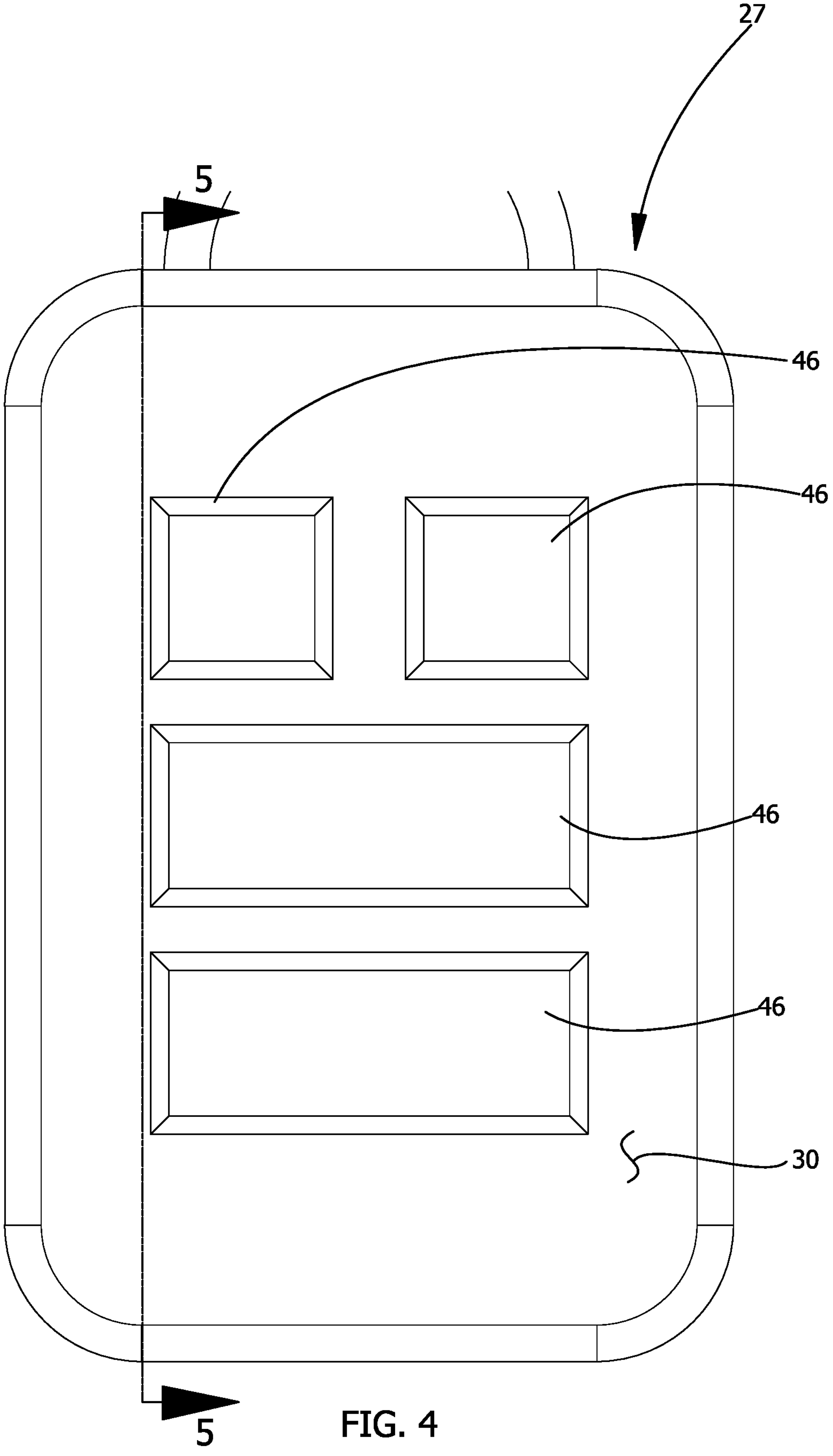
FIG. 4 is a front view of an embodiment of the disclosure.
Figure 5:
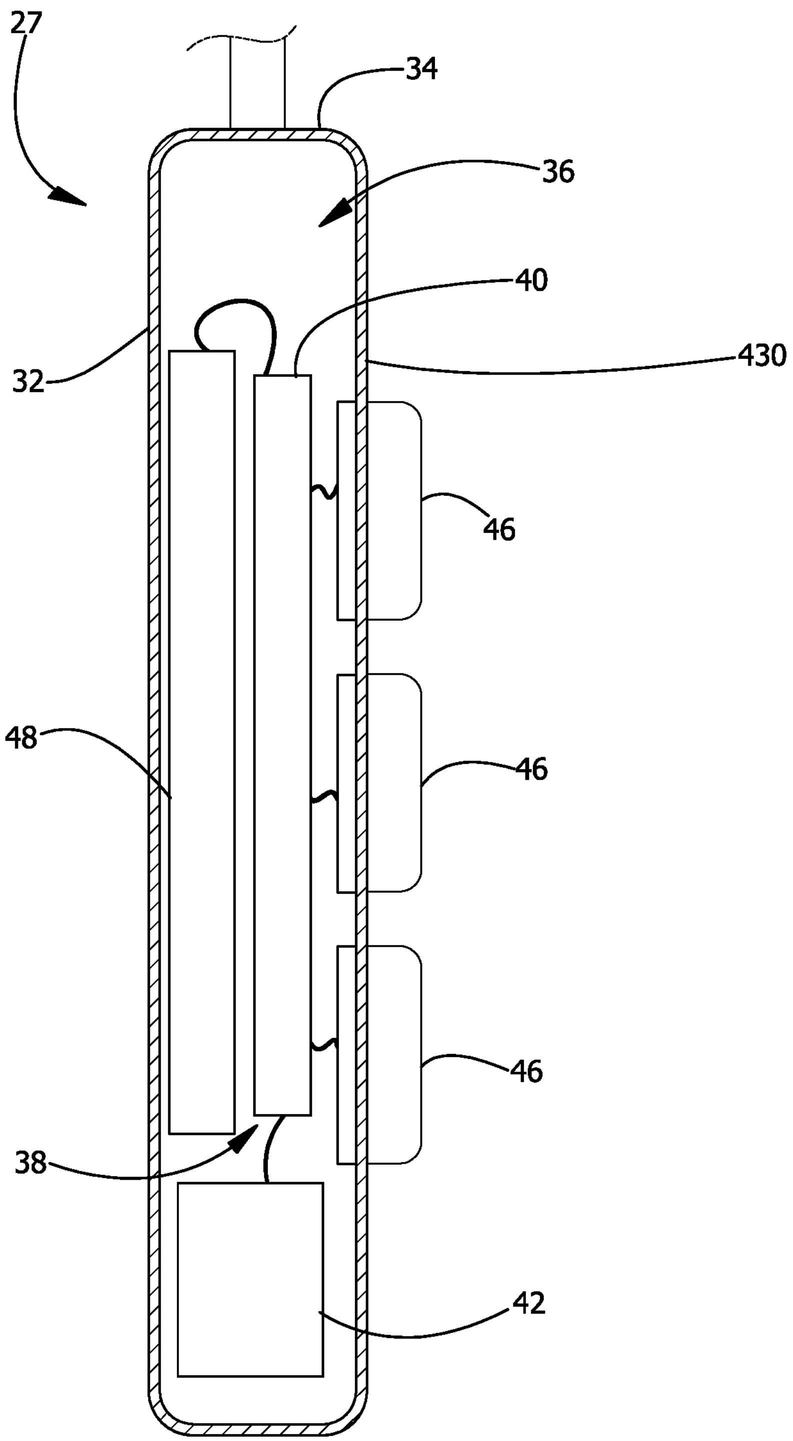
FIG. 5 is a cross-sectional view of an embodiment of the disclosure.

Such embodiments may further comprise a button 46 that is mounted on the bow 28, for example on the front wall 30. Some such embodiments may include more than one button 46, as shown in FIGS. 4 and 5. The button 46 is electronically coupled to the central processing unit 40. Actuation of the button 46 signals the central processing unit 40 to wirelessly connect the global positioning system unit 42 with the application 22. The user interface 24 may be configured to facilitate wirelessly connecting the global positioning system unit 42 with the application 22 such that the global positioning system unit 42 is in wireless electronic communication with the application 22. For example, the user interface 24 may provide guided, step-by-step instructions for wirelessly connecting the global positioning system unit 42 with the application 22 or for identifying the particular key 26 in which the global positioning system unit 42 is positioned.

In other embodiments, the location identifying means 38 may generally comprise a radio frequency identification tag 50 that is positioned within the interior space 36. The radio frequency identification tag 50 is wirelessly couplable to the personal electronic device 20. The user interface 24 may be configured to wirelessly couple the radio frequency identification tag 50 to the personal electronic device 20. For example, the user interface 24 may provide guided, step-by-step instructions for wirelessly connecting the radio frequency identification tag 50 with the application 22 or for identifying the particular key 26 in which the radio frequency identification tag 50 is positioned. The radio frequency identification tag 50 is actuatable to relay the data corresponding to the location to the application 22 thereby providing the location of the key 26.

In such embodiments, the user interface 24 may include the map 44 showing the location of the key 26 when the radio frequency identification tag 50 is wirelessly coupled to the personal electronic device 20. The user interface 24 may also have an electronic button 52, wherein actuating the electronic button 52 signals the radio frequency identification tag 50 to relay the location data to the personal electronic device 20.

A battery 48 is positioned within the interior space and electronically coupled with the location identifying means 38. For example, the battery 48 may be electronically coupled with the central processing unit 42 or with the radio frequency identification tag 50.

In use, a user can connect as may keys 26 or electronic key fobs 27 to the application 22 as desired. In some embodiments, the user may use the button 46 on the bow 28 to connect the key 26 with the application 22. In other embodiments, the user may use the electronic button or other means within the user interface 24 to connect the key 26 with the application 22. When the user is unable to find the key 26, the user can open the application 22 and view the map 44 showing the location of each connected key 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A key tracking system comprising:

an electronic device, the electronic device having an application providing a user interface;

a key having a bow and a blade, the blade being coupled to and extending from the bow, the blade being inseparably coupled to the bow, the bow having a front wall, a rear wall, and a peripheral wall extending between the rear wall and the front wall to define an interior space between the front wall and the rear wall;

a location tracker being integrated within the interior space and electronically coupled to the application, the location tracker identifying a location of the key and relaying data corresponding to the location to the application thereby indicating the location of the key on the application; and a battery being positioned within the interior space, the battery being electronically coupled with the location tracker.

2. The key tracking system of claim 1, wherein the electronic device comprises at least one of a mobile phone, a smart watch, a tablet, and a computer.

3. The key tracking system of claim 1, wherein the application includes an internet browser and wherein the user interface includes a website.

4. The key tracking system of claim 1, the location tracker further comprising:

a central processing unit being positioned within the interior space, the central processing unit being in wireless electronic communication with the application;

a global positioning system unit being positioned within the interior space, the global positioning system unit being electronically coupled with the central processing unit, the global positioning system unit providing a location of the key to the central processing unit, whereby the central processing unit is configured to provide data identifying the location to the application; and the user interface including a map showing the location of the key when the global positioning system unit is in wireless electronic communication with the application.

5. The key tracking system of claim 4, further comprising a button being mounted on the bow, the button being electronically coupled to the central processing unit, actuation of the button signaling the central processing unit to wirelessly connect the global positioning system unit with the application, wherein the user interface is configured to facilitate wirelessly connecting the global positioning system unit with the application such that the global positioning system unit is in wireless electronic communication with the application.

6. The key tracking system of claim 1, the location tracker further comprising:

a radio frequency identification tag being positioned within the interior space, the radio frequency identification tag being wirelessly couplable to the personal electronic device, wherein the user interface is configured to wirelessly couple the radio frequency identification tag to the personal electronic device, the radio frequency identification tag being actuatable to relay the data corresponding to the location to the application thereby providing the location of the key; and the user interface including a map showing the location of the key when the radio frequency identification tag is wirelessly coupled to the personal electronic device, the user interface having an electronic button, the electronic button signaling the radio frequency identification tag to relay the location data.

7. The key tracking system of claim 1, wherein the key comprises an electronic key fob.

8. A key tracking system comprising:

a personal electronic device, the personal electronic device having an application providing a user interface;

a key having a bow and a blade, the blade being coupled to and extending downwardly from the bow, the blade being inseparably coupled to the bow, the bow having a front wall, a rear wall, and a peripheral wall extending between the rear wall and the front wall to define an interior space between the front wall and the rear wall;

a location identifying means being integrated within the interior space and electronically coupled to the application, the location identifying means identifying a location of the key and relaying data corresponding to the location to the application thereby indicating the location of the key on the application, the location identifying means comprising:

a radio frequency identification tag being positioned within the interior space, the radio frequency identification tag being wirelessly couplable to the personal electronic device, wherein the user interface is configured to wirelessly couple the radio frequency identification tag to the personal electronic device, the radio frequency identification tag being actuatable to relay the data corresponding to the location to the application thereby providing the location of the key;

the user interface including a map indicating the location of the key when the radio frequency identification tag is wirelessly coupled to the personal electronic device, the user interface having an electronic button, wherein actuation of the electronic button signals the radio frequency identification tag to relay the location data to the personal electronic device; and a battery being positioned within the interior space, the battery being electronically coupled with the radio frequency identification tag.

9. A key tracking system comprising:

an electronic device, the electronic device having an application with a user interface, the application including an internet browser, the electronic device comprising a mobile phone;

a key having a bow and a blade, the blade being coupled to and extending downwardly from the bow, the blade being inseparably coupled to the bow, the bow having a front wall, a rear wall, and a peripheral wall extending between the rear wall and the front wall to define an interior space between the front wall and the rear wall, the key comprising a standard key;

a location identifying means being integrated within the interior space and electronically coupled to the application, the location identifying means identifying a location of the key and relaying data corresponding to the location to the application thereby indicating the location of the key on the application, the location identifying means comprising:

a central processing unit being positioned within the interior space, the central processing unit being in wireless electronic communication with the application;

a global positioning system unit being positioned within the interior space, the global positioning system unit being electronically coupled with the central processing unit, the global positioning system unit providing a location of the key to the central processing unit, whereby the central processing unit is configured to provide data identifying the location to the application;

the user interface including a map providing the location of the key when the global positioning system unit is in wireless electronic communication with the application;

a button being mounted on the front wall, the button being electronically coupled to the central processing unit, actuation of the button signaling the central processing unit to wirelessly connect the global positioning system unit with the application, wherein the user interface is configured to facilitate wirelessly connecting the global positioning system unit with the application such that the global positioning system unit is in wireless electronic communication with the application;

a battery being positioned within the interior space, the battery being electronically coupled with the central processing unit.

* * * * *